United States Patent [19]
Wiegand

[11] 3,824,456
[45] July 16, 1974

[54] MAGNETOMETER FLOWMETER USING PERMANENT MAGNETS AND MAGNETOMETER ELEMENTS ALIGNED WITH THE FLOW

[75] Inventor: David E. Wiegand, Idaho Falls, Idaho

[73] Assignee: The United States of America as represented by the United States Atomic Energy Commission, Washington, D.C.

[22] Filed: Feb. 23, 1973

[21] Appl. No.: 335,280

[52] U.S. Cl. .................... 324/34 FL, 73/194 EM
[51] Int. Cl. ............................................ G01r 33/12
[58] Field of Search ........ 324/34 R, 34 F, 40, 43 R; 73/194 R, 194 E, 194 EM

[56] References Cited
UNITED STATES PATENTS

| | | | |
|---|---|---|---|
| 2,435,043 | 1/1948 | Lehde et al. | 324/40 |
| 2,836,791 | 5/1958 | Kaplan | 324/43 R |
| 2,861,242 | 11/1958 | Leavitt | 324/43 R |
| 3,191,436 | 6/1965 | Davis | 73/194 EM |
| 3,292,079 | 12/1966 | Schindler | 73/194 EM |
| 3,595,076 | 7/1971 | Eyges | 73/194 EM |
| 3,736,798 | 6/1973 | Wood et al. | 73/194 EM |

FOREIGN PATENTS OR APPLICATIONS

| | | | |
|---|---|---|---|
| 142,081 | 1/1961 | U.S.S.R. | 324/34 F |
| 172,073 | 8/1963 | U.S.S.R. | 73/194 EM |
| 988,964 | 4/1965 | Great Britain | 324/43 R |
| 1,157,500 | 5/1958 | France | 324/40 |

Primary Examiner—Robert J. Corcoran
Attorney, Agent, or Firm—John A. Horan; Arthur A. Churm; Walter L. Rees

[57] ABSTRACT

A flowmeter for measuring the flow of conducting fluids, in particular liquid sodium, is described. The flowmeter includes a permanent magnet or electromagnet for setting up a steady-state magnetic field in the fluid. A fluxgate element is positioned so as to detect the magnetic field developed by the movement of the fluid through the steady-state magnetic field. The magnitude of the magnetic field developed by the fluid motion is a measure of the fluid velocity.

6 Claims, 9 Drawing Figures

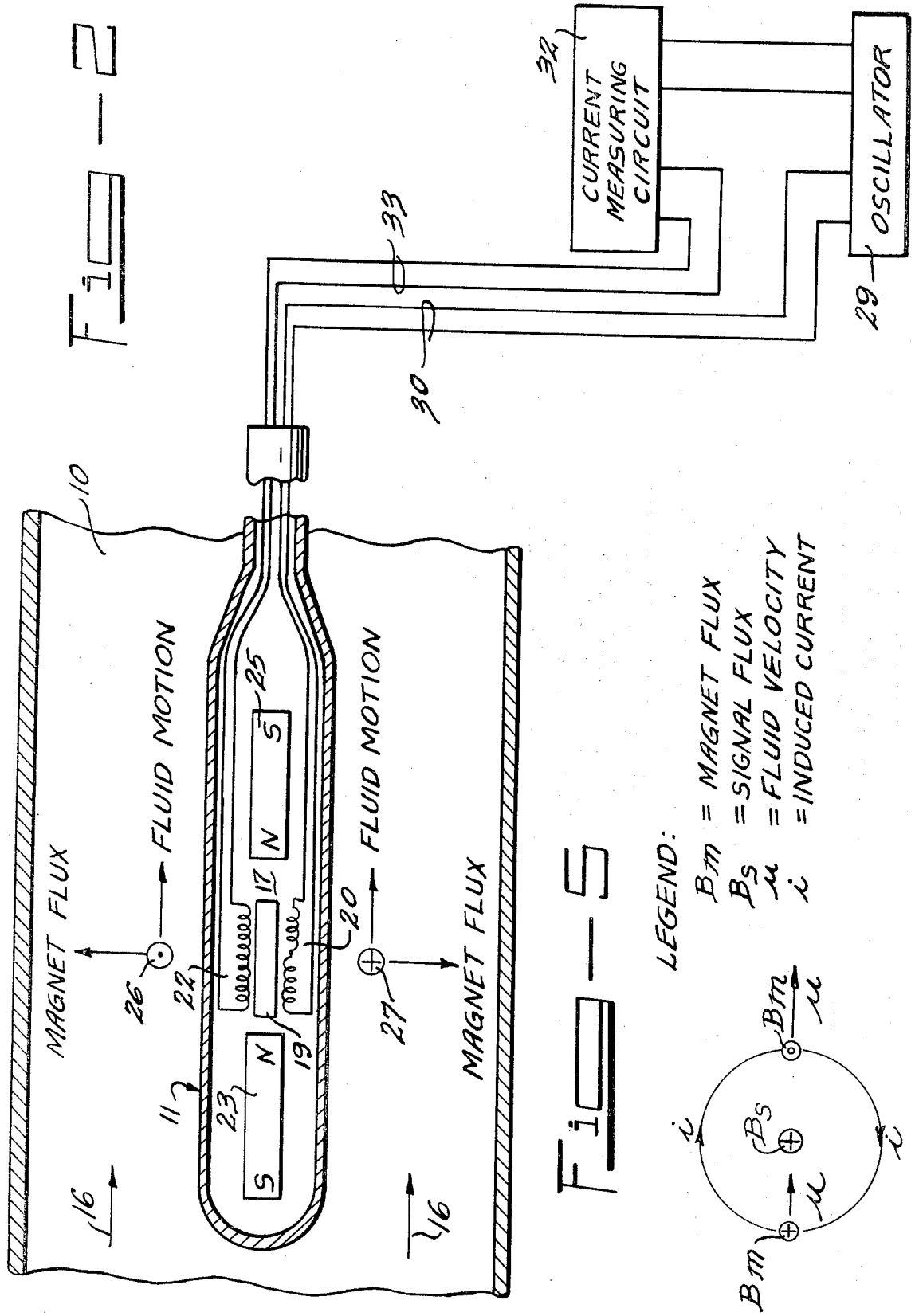

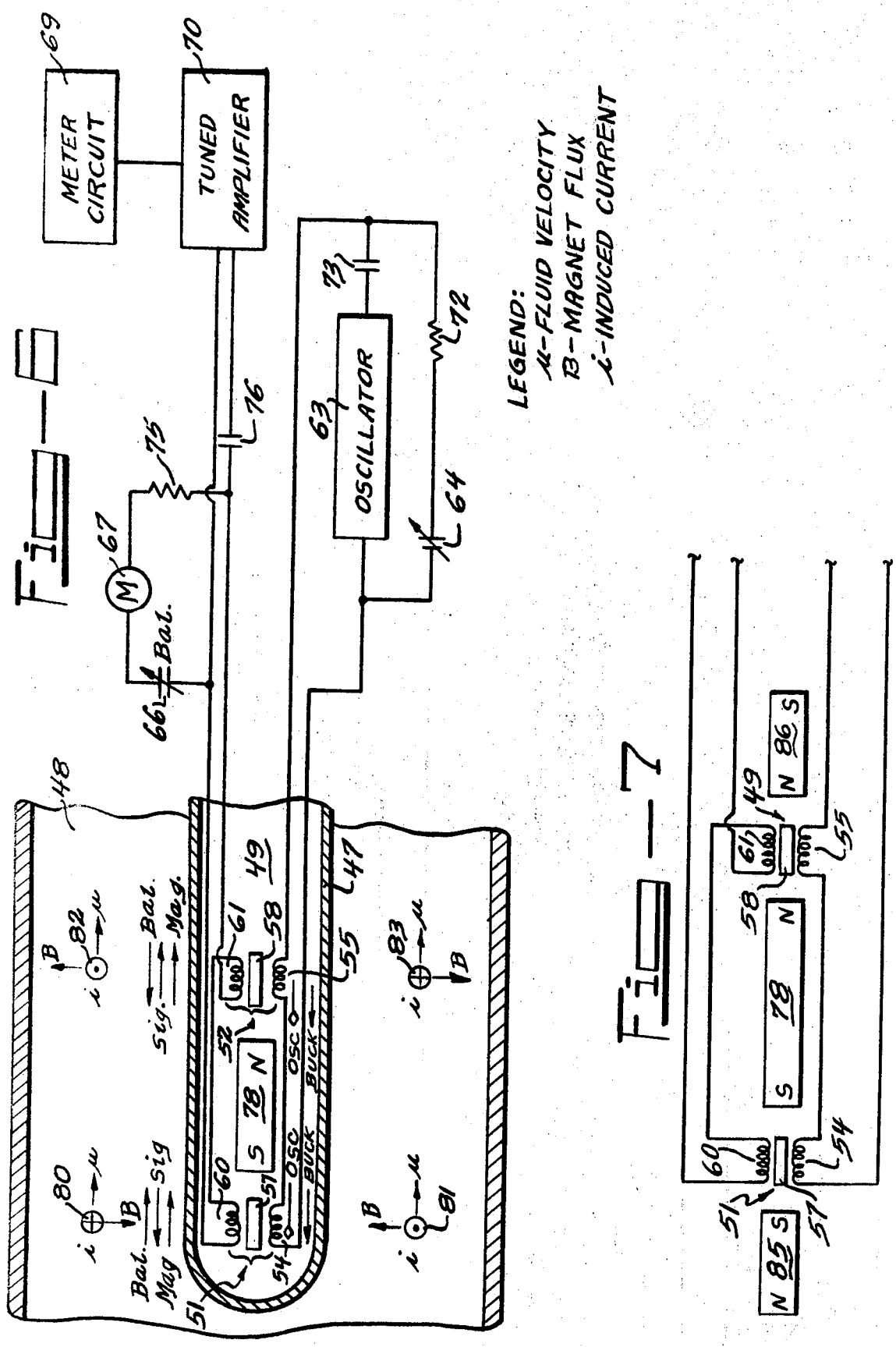

MAGNETOMETER FLOWMETER USING PERMANENT MAGNETS AND MAGNETOMETER ELEMENTS ALIGNED WITH THE FLOW

CONTRACTUAL ORIGIN OF THE INVENTION

The invention described herein was made in the course of, or under, a contract with the United States Atomic Energy Commision.

BACKGROUND OF THE INVENTION

In order to operate many heat-generating devices, it is necessary that the flow of various fluids through the apparatus be measured. This is particularly true in reactors using liquid sodium as a coolant where the loss of coolant flow can lead to dangerous reactor conditions. In a reactor, it is not always possible to have access to the coolant pipes so that a probe type of flowmeter for measuring the flow of sodium coolant is desirable. The probe type flowmeter is inserted directly into the pipe through which the fluid flows to measure the fluid flow velocity inside the pipe. This type of flow meter must therefore be capable of withstanding the liquid sodium environment, that is, a very corrosive and very hot environment. However, it is sometimes desirable to use a flowmeter which does not have to enter the coolant pipe and which can be positioned on the outside of the pipe without requiring modification of the pipe.

Permanent magnet type flowmeters have been developed which can be used in a probe configuration. However, this type of permanent magnet flowmeter is not sufficiently sensitive for many applications. In particular there are requirements for transmitting the fine details of flow noise (for bubble sensing) so that an incipient boiling condition can be detected. Eddy current type flowmeters have been useful for this type of detection. However, they are not always suitable for reactor conditions. For example, the pipes containing the coolant have relatively thick conducting walls which give rise to large eddy current losses. This is also true when a conducting sheath is used to cover the probe type of eddy current flowmeter. The use of nonconducting pipes and/or probe sheaths is precluded in most installations because of cost and environmental conditions.

It is therefore an object of this invention to provide an improved type of flowmeter which can be used as a probe in a coolant pipe or outside of the coolant pipe.

Another object of this invention is to provide a flowmeter which is simple and of rugged construction and relatively inexpensive.

Another object of this invention is to provide a flowmeter which has a high degree of sensitivity.

Another object of this invention is to provide a flowmeter which can withstand high temperatures and a corrosive environment.

SUMMARY OF THE INVENTION

In practicing this invention, a flowmeter is positioned in a conducting fluid. The flowmeter includes a fluxgate magnetic detector positioned between a pair of permanent magnets with the fluxgate excited by an alternating current. The permanent magnets are positioned so that lines of flux of the magnetic field therefrom are perpendicular to the flow direction of the fluid. A metering circuit is attached to the fluxgate in order to measure the current developed by the fluid motion through the magnetic field. Various DC balancing currents can be applied to the fluxgate to balance out undesired magnetic fields and electromagnets can be used in place of the permanent magnets. In another embodiment of the invention, a single permanent magnet can be used, together with a single fluxgate which can be positioned outside of the fluid pipe. A single magnet can also be used with a pair of fluxgates connected to form a gradiometer to measure the magnetic field gradient developed as a result of fluid motion through the magnetic field of the permanent magnet. Additional permanent magnets can be added to the structure to balance out stray magnetic fields or DC currents can be applied to the fluxgates for the same purpose.

BRIEF DESCRIPTION OF THE DRAWINGS

The invention is illustrated in the drawings, of which:

FIG. 2 is a partial schematic and partial view of the details of the probe type flowmeter incorporating a single fluxgate;

FIGS. 4 and 5 are views and a vector diagram showing the details and operation of another embodiment of the invention which can be placed outside of the fluid pipe;

FIG. 6 is a partial schematic and partial block diagram of a gradiometer flowmeter;

FIG. 7 is an alternate form of the device of FIG. 6;

DETAILED DESCRIPTION OF THE INVENTION

Figure 1:
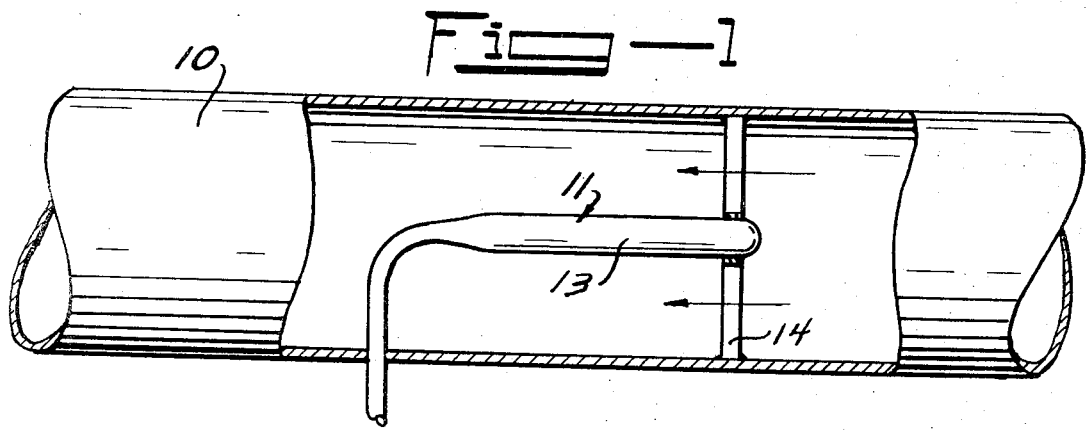
FIG. 1 shows a flowmeter inserted in a fluid pipe.

Referring to FIG. 1, there is shown a pipe 10 through which a conducting fluid is flowing. A magnetometer flowmeter 11 is positioned in the fluid stream to measure the flow rate. The flowmeter 11 may be inserted into the fluid stream through a permanently mounted tube 13 held in position by support 14.

In FIG. 2 there is shown a drawing of the magnetometer flowmeter 11 of FIG. 1, together with the circuitry used to measure the flow rate. In FIG. 2 the flowmeter 11 is considered to be immersed in a moving fluid with the direction of flow being indicated by the arrows 16. The supporting structure for the flowmeter is not shown in FIG. 2. The flowmeter includes a fluxgate sensor 17 having a core 19, a primary winding 20 and a secondary winding 22. In an example of a fluxgate sensor, primary winding 20 is wound in a single layer over core 19 with the second half of the turns in the primary winding being wound in the opposite direction from the first half of the turns, the change in direction being accomplished by means of a hairpin turn in the middle of the primary winding. Thus a current in the primary winding magnetizes the two halves of the core in opposite directions. The two portions of the primary winding are wound in the opposite sense. Secondary winding 22 is wound in one or more layers over the primary winding in a symmetrical fashion. The various turns of the secondary winding are wound in the same direction or the same sense.

Fluxgate element 17 is located in the neutral region of two permanent magnets 23 and 25. The poles of magnets 23 and 25 adjacent core 19 have the same polarity so that the net applied axial field through core 19 is substantially zero. While permanent magnets are shown in FIG. 2, the magnets 23 and 25 could be replaced by electromagnets if this is desired. When magnetometer flowmeter 11 is placed in a conducting fluid, for example, liquid sodium, the net applied axial field is still zero as long as the fluid is stationary. However, if the fluid moves in a direction parallel to the axis of the core 19, interaction of the fluid with the radial component of the magnetic flux from magnets 23 and 25 causes circumferential currents to flow in the fluid as indicated by the vector diagrams 26 and 27. The notation used in vector diagrams 26 and 27 is standard, with currents into and out of the paper indicated by $\oplus$ and $\odot$ respectively.

An alternating current from an oscillator 29 is fed to the primary winding 20 through connecting wires 30. With perfect symmetry in the core and windings and with no magnetic field applied to the core, the coupling between the primary and secondary is zero and a zero voltage appears at the terminal of the secondary coil. The circumferential currents in the fluid represented by vector diagrams 26 and 27 result in an axial field through core 19. When a field having an axial component is applied to core 19, the condition of symmetry is destroyed, and a voltage is developed in the secondary winding 22. This voltage is measured in current-measuring circuit 32 which is connected to the secondary winding 22 by wires 33. It has been found analytically and experimentally that the resulting secondary voltage consists of the even harmonics of the fundamental oscillator frequency, the second harmonic being the strongest. The magnitude of the secondary voltage is found to increase approximately linearly with the applied field up to the point of saturation of core 19. The circumferential currents in the fluid develop an axial field which is proportional to the fluid velocity so that the output of the secondary winding is linear with respect to the fluid velocity.

The current-measuring circuit 32 could include an amplifier tuned to twice the oscillator frequency feeding a phase detector or "locked in" amplifier. By appropriate choices of the time constants of the amplifiers, disturbances at undesired frequencies can be eliminated.

The problem of eddy currents is not present in this type of flowmeter. The radial field from the magnets 23 and 25 is unvarying and the signal field at the sensor is at most slowly varying as the fluid velocity slowly varies. Thus, the problem of eddy currents in the case wall does not exist. This is in contrast with the eddy current type of flowmeter in which the pipe wall thickness must be kept as thin as possible to eliminate serious signal losses due to induced currents in these barriers.

The strength of the radial field from magnets 23 and 25 is zero at the axis and increases to a maximum value and finally decreases at points away from the axis. The radius for maximum field strength is controlled by the spacing between the magnets. For example, using the configuration of FIG. 2, a flowmeter has been designed where the maximum field exists at points about 9/16 inch out from the axis. The case diameter was approximately 3/8 inch. The outside radius of the thimble was held to about 5/16 inch so that the flowmeter was still 1/4 inch in from the region of maximum field; thus the effects of a varying velocity profile had only a minor effect and an undesired extreme sensitivity to fluid layers immediately adjacent to the barrier wall was eliminated. This effect can be serious in encapsulated versions of the eddy current flowmeter, particularly if a high carrier frequency is used.

Figure 3:
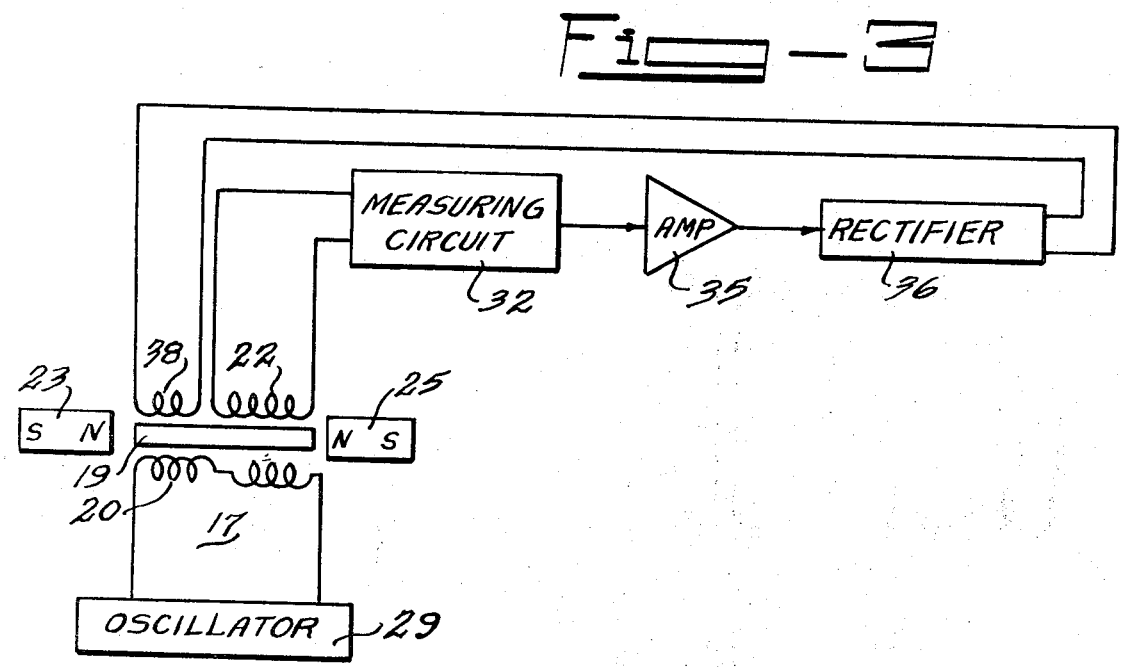
FIG. 3 is a partial schematic and partial block diagram illustrating the operation of another embodiment of the circuit of FIG. 2.

Referring to FIG. 3, there is shown a partial block diagram and partial schematic of a flowmeter circuit. Portions of the flowmeter circuit which are the same as those shown in FIG. 2 have the same reference numerals. The fluid and vector diagrams of FIG. 2 are not shown in FIG. 3. In the circuit of FIG. 3 a portion of the output current is amplified in amplifier 35 and rectified in rectifier 36. The DC current from rectifier 36 is fed back into an additional winding 38. With sufficient open loop gain, the net field in the fluxgate core 19 can be held very close to zero and the feedback current to winding 38 can then be measured to measure the fluid velocity. With this system of feedback, variations in the sensitivity of the fluxgate, the tuned amplifier and demodulator are essentially eliminated. The DC current from rectifier 36 could also be applied to the secondary winding 22 directly if desired.

Figure 4:
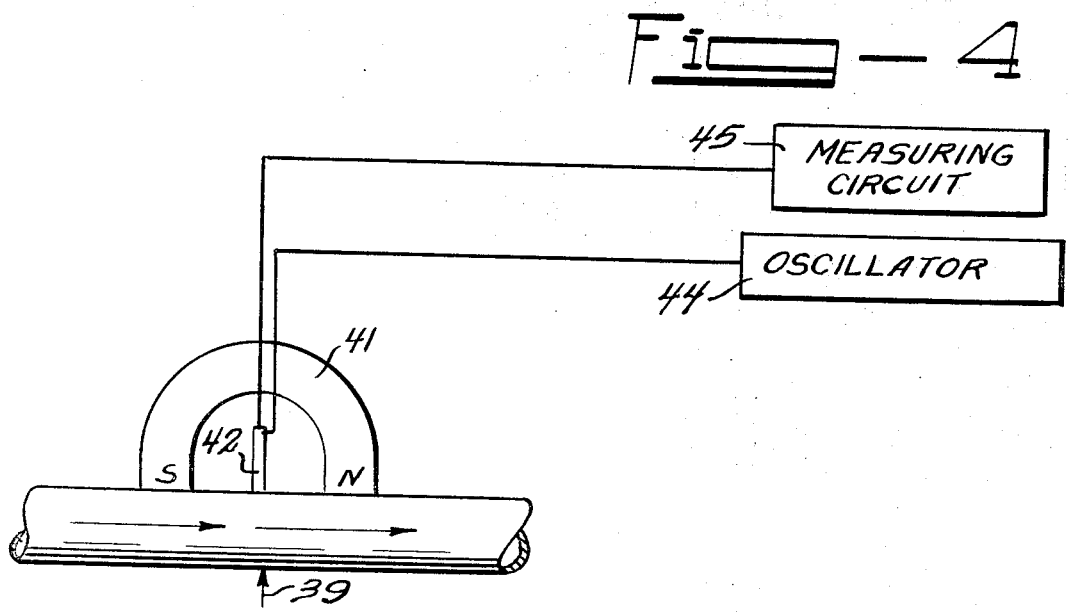

Referring to FIGS. 4 and 5, there is shown a flowmeter which can be mounted outside of the conduit containing the fluid. FIG. 5 is a vector diagram for the flowmeter of FIG. 4 looking from beneath the fluid pipe as shown by arrow 39. The flowmeter comprises a permanent magnet 41 and a magnetometer element 42. Magnetometer element 42 is similar to the magnetometer element 17 of FIG. 2 and includes a primary coil wound in separate directions and a secondary coil. The magnetometer element 42 is coupled to an oscillator 44 and a measuring circuit 45 in the same manner as magnetometer element 17 of FIG. 2.

In FIG. 5 the vector diagram of the magnetic field and induced currents of the structure of FIG. 4 are shown. The magnetic field from magnet 41 is shown as $B_m$ and the conducting fluid flowing through this magnetic field develops a circulating current represented by $i$. The circulating current $i$ develops a magnetic field $B_s$ which passes through the core of magnetometer 42, destroying the symmetry of the magnetic field through the core of magnetometer 42. The output of oscillator 44 is coupled from the primary to the secondary and measured in measuring circuit 45 in the same manner as that described from the circuit of FIG. 2. While the magnetometer has been shown positioned between poles of magnet 41, it can be placed opposite the magnet if desired. Further, magnet 41 can be replaced by an electromagnet if this is desired.

Referring to FIG. 6, there is shown another embodiment of the invention in which a gradiometer magnetometer is used. The magnetometer 49 is positioned in a sheath 47 which is placed within pipe 48 containing the fluid, the velocity of which is to be measured. The gradiometer magnetometer flowmeter is particularly useful when the flowmeter must be operated under very high sensitivity conditions and where there are stray magnetic fields present. An example of this use is when the flowmeter is used to detect the onset of bubbles or incipient boiling in the sodium coolant of a nuclear reactor. In the device shown in FIG. 6, the gradiometer flowmeter 49 is placed within the fluid, while the remaining portions of the device are mounted outside of the fluid stream and connected to the magnetometer flowmeter by means of connecting wires.

The two fluxgate elements 51 and 52 can be thought of as being two halves of the fluxgate device of FIG. 2. The fluxgate elements consist of primary coils 54 and 55 wound around core elements 57 and 58 respectively. Secondary windings 60 and 61 are wound over the primary coils 54 and 55 respectively. Coil 61 is wound in the opposite sense from coil 60. The flowmeter would be operable with the primary and secondary coils interchanged.

Oscillator 63 is a source of alternating current for driving the primary coils 54 and 55 of the fluxgates. For example, a drive current frequency in the kHz range has been found to be suitable in the operation of a device of this type. The device is not limited to this frequency range, however. The source of bucking current is shown as a variable battery 64 and can be any adjustable DC supply to circulate DC current in the primary fluxgate coils. Battery 66 is also an adjustable DC supply to circulate DC current in the secondary of the fluxgate coils. Meter 67 is used to measure the DC current circulated within the secondary coils by the balance supply 66 while meter circuit 69 measures the output of tuned amplifier 70. Tuned amplifier 70 is designed to have a high gain only for signals at twice the frequency of oscillator 63. A further refinement in this circuit could be to replace the tuned amplifier 70 with a "lock-in" amplifier or phase detector circuit to provide discrimination against unwanted signals. Resistor 72 prevents the short-circuiting of oscillator 63 by the bucking power supply 64 and capacitor 73 blocks the DC bucking current so that all of the DC bucking current flows through the primary coils 54 and 55. Resistance 75 prevents short-circuiting of the input to tuned amplifier 70 by the balance supply 66 and the meter 67. Capacitor 76 blocks the DC current from the tuned amplifier 70 so that all of the balance current flows through the secondary windings 60 and 61.

The vectors Bal and Sig adjacent to the fluxgates 49 and 51 indicate the magnetic field directions through cores 57 and 58 due to the balance current in the secondary and the induced current in the fluid respectively. The vector Mag indicates the magnetic field direction due to the axial field of magnet 78. The vectors Osc and Buck indicate the magnetic field directions due to the AC current from the oscillator 63 and the DC current from the bucking supply 64. The open arrowhead on the Osc vector indicates that this is an AC vector which has the direction indicated only half of the time. Note that the Sig vector opposes the Osc vector in one fluxgate element and aids it in the other.

The vectors 80, 81, 82 and 83 show the fluid velocity (u) and the field in the fluid due to the magnet 78 (B). Induced current in the fluid (i) is represented by the vectors into and out of the drawing. The induced current in the fluid develops a field through the cores 57 and 58 of the fluxgates represented by the Sig vector. In the single magnet version of a gradiometer fluxgate flowmeter shown in FIG. 6, the longitudinal field component of magnet 78 may polarize the fluxgate cores 57 and 58 sufficiently to affect adversely the fluxgate action. The DC field bucking current from power supply 64 is adjusted to oppose the magnet field to cause the sensing elements to operate under more favorable conditions. In FIG. 7 there is shown an embodiment of the flowmeter of FIG. 6 in which the bucking current coils are replaced by compensating magnets 85 and 86. The advantage of using magnets 85 and 86 in place of the bucking current supply is that the main magnet 78 and the auxiliary magnets 85 and 86 balance each other at large distances from the sensor. This nulling effect will reduce undesired interactions between adjacent sensors.

Referring again to FIG. 6, the opposing Sig vectors produce additive signals in the fluxgate secondaries 60 and 61 due to the reversal of the secondary coils. This signal is amplified in tuned amplifier 70 and measured in metering circuit 69. The amplitude of this signal is a function of the velocity of the fluid flowing in pipe 48. An external field disturbance, however, will produce subtractive signals in the fluxgate secondaries 60 and 61. Thus, external field disturbance can create an error signal only if its magnitude and/or direction is different at the two fluxgate locations. In other words, for an external disturbance, the response of the fluxgates 51 and 49 is to the gradient of the field disturbance. Since the positions of fluxgates 49 and 51 are very close, the field gradient caused by an external disturbance will normally be very small and therefore an external disturbance will create only a very small error signal in the system.

In order to reduce the effects of sensitivity variations in the fluxgates 49 and 51, gain variations in the tuned amplifier and drift in the oscillator circuit, the signals applied to tuned amplifier 70 are reduced to zero. This is accomplished by applying the DC balancing current from DC supply 66 to the secondaries 60 and 61. The balancing current represented by the Bal vectors balance out the Sig vectors so that the signal in metering circuit 69 is reduced to zero. Thus, tuned amplifier 70 and metering circuit 69 serve as a nulling circuit with the variable balance of supply 66 being adjusted to make the metering circuit 69 read zero or a minimum value. The DC balancing current metered by meter 67, suitably calibrated, serves as a measure of the fluid velocity.

Figure 8:
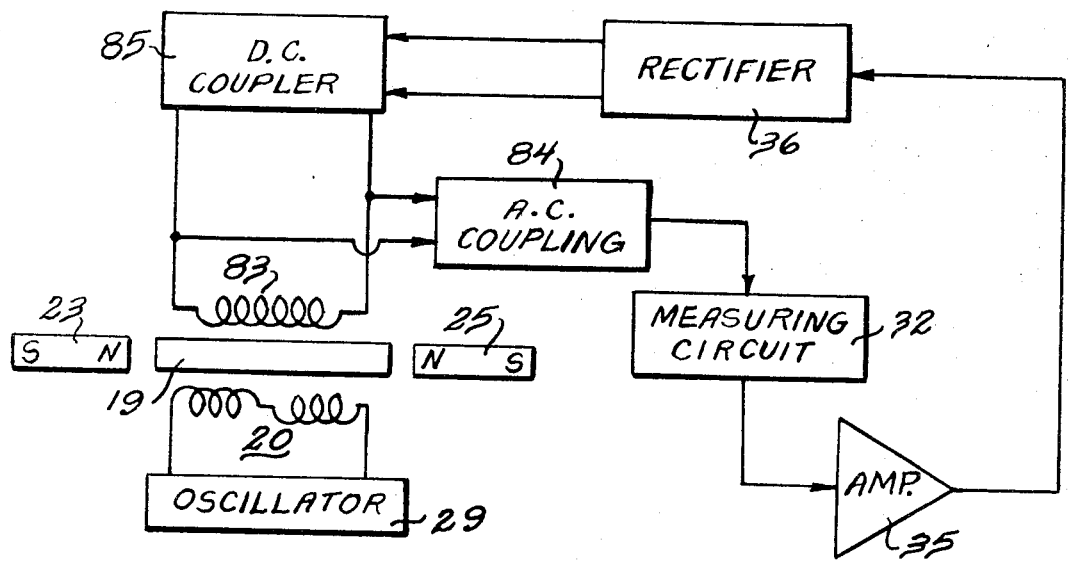
FIG. 8 is a block diagram of an alternate feedback arrangement.

In FIG. 8 there is shown a form of the device in which the secondary coil is used for feedback. This circuit is similar to that of FIG. 3 and identical portions have the same reference numerals. In the circuit of FIG. 8 the secondary coil 83 is also used as the feedback winding. Coil 83 is coupled to measuring circuit 32 through an AC coupling network 84 and the DC feedback current from rectifier 36 is coupled to coil 83 through the DC coupling network 85. Thus the probe can be simplified by removing a winding at the expense of a slight increase in the complexity of the external circuitry.

Figure 9:
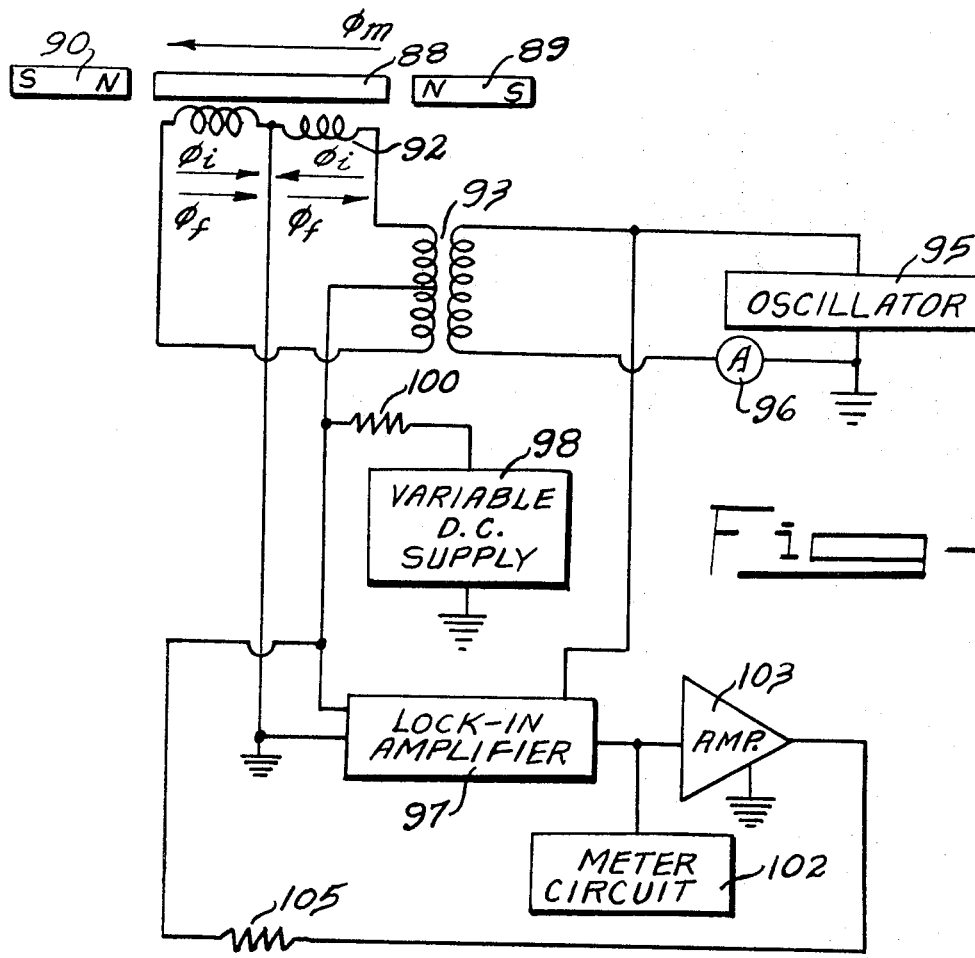
FIG. 9 is a block diagram of a single coil device.

In FIG. 9 there is shown a magnetometer structure which is further simplified so that only one coil is required. The magnetometer has a core 88 in the neutral region of two permanent magnets 89 and 90. The magnetometer has a single coil 92 with the second half of the turns being wound in the opposite direction from the first half of the turns. Thus a current in winding 92 magnetizes the two halves of core 88 in opposite directions as shown by the arrows $\phi_i$.

Coil 92 is connected to the center tapped secondary of transformer 93. The primary of transformer 93 is connected to oscillator 95 and meter 96. The AC signal from oscillator 95 is thus coupled to the magnetometer coil 92 through transformer 93. The center tap of the secondary of transformer 93 is connected to variable DC supply 98 through isolating resistor 100 and to lock-in amplifier 97. Lock-in amplifier 97 and supply 98 are also connected to the center of magnetometer coil 92. The output of lock-in amplifier 97 is connected to a meter circuit 102 and amplifier 103. Lock-in amplifier 97 may be, for example, a phase detector which receives a reference signal from oscillator 95 and develops a DC output signal in response to a signal from magnetometer coil 92. The DC output signal is coupled to the center tap of the secondary of transformer 93 through isolation resistor 105 and to the center of coil 92.

In operation, with the fluid flow past the flowsensor at zero, the output signal from the flowsensor applied to lock-in amplifier 97 is zero as the flux $\phi_i$ in each half of core 88 is equal and opposing. When the fluid flow is greater than zero, a flux $\phi_m$ is developed in core 88 which adds to the flux in one half of core 88 and subtracts from the flux in the other half of the core. The flux unbalance in the core acts to develop an output signal between the center tap of transformer 93 secondary and the coil 92 center tap. This output signal is detected by lock-in amplifier 97 to develop a DC signal which is fed back to coil 92 through the coil 92 and transformer 93 center taps. The polarity of the DC feedback signal is chosen so that flux $\phi_f$ is developed in core 88 to oppose $\phi_m$. The magnitude of the DC signal from lock-in amplifier 97 is a measure of the fluid velocity and is measured by meter circuit 102.

In the description of this flowsensor it has been described as being in a pipe. However, this flowsensor works equally well in any fluid without regard to its container.

The embodiments of the invention in which an exclusive property or privilege is claimed are defined as follows:

1. A flowmeter for measuring the velocity of a moving conducting fluid, comprising, first and second permanent magnets each having a longitudinal axis with the poles thereof positioned at opposite ends of said longitudinal axis, said first and second permanent magnets being positioned in spaced apart relationship with their longitudinal axes substantially in line and parallel with said direction of flow of said conducting fluid, said first and second permanent magnets developing a first magnetic field in the conducting fluid with said first magnetic field having components perpendicular to the direction of flow of the conducting fluid and a magnitude which is constant with time, the moving conducting fluid reacting with said first magnetic field to develop induced currents with the magnitude of said induced currents being proportional to said fluid velocity, said induced currents acting to develop a second magnetic field with the magnitude thereof being a function of the velocity of the conducting fluid and constant with a constant fluid velocity, a magnetometer element positioned in said second magnetic field and having a core with a longitudinal axis and being positioned between said first and second permanent magnets with said longitudinal axis of said core substantially in line with said longitudinal axis of said permanent magnets, said first and second permanent magnets further having like poles adjacent said core so that said first magnetic field in said core is substantially zero, first and second windings positioned on said core and around said axis, said first winding including first and second portions with said first portion wound in an opposing sense to said second portion, measuring circuit means including an AC signal generator coupled to one of said first and second windings for supplying an AC signal thereto, the other of said first and second windings being responsive to said AC signal and said second magnetic field to develop an output signal, and metering means coupled to said other of said first and second windings for measuring the magnitude of said output signal.

2. The flowmeter of claim 1 wherein, said magnetometer element includes a third winding on said core, feedback circuit means coupling said third winding to said other of said first and second windings, said feedback circuit means being responsive to said output signal to develop a feedback signal and couple the same to said third winding in a sense to develop a third magnetic field in said core opposing said second magnetic field therein.

3. A flowmeter for measuring the velocity of a moving conductive fluid, comprising, a first permanent magnet having a longitudinal axis positioned parallel with the direction of fluid flow with the poles thereof positioned at opposite ends of said longitudinal axis, said first permanent magnet developing a first magnetic field in the conducting fluid with said first magnetic field having components perpendicular to the direction of fluid flow and a magnitude which is constant with time, the moving conducting fluid reacting with said first magnetic field to develop inducted currents with the magnitude of said induced currents being proportional to said fluid velocity, said induced currents acting to develop a second magnetic field with the magnitude thereof being a function of the velocity of the conducting fluid and constant with a constant fluid velocity, a magnetometer element positioned in said second magnetic field and including first and second cores each having a longitudinal axis, said first and second cores being positioned with said longitudinal axis thereof substantially in line and parallel with said longitudinal axis of said first permanent magnet, said first core being positioned at one end of said first permanent magnet and said second core being positioned at the other end of said first permanent magnet, a first winding having first and second portions positioned on said first and second cores respectively and around said longitudinal axes thereof with said first and second portions of said first winding being connected in series in the same sense, a second winding having first and second portions positioned on said first and second cores respectively and around said longitudinal axes thereof with said first and second portions of said second winding being connectd in series in an opposing sense, measuring circuit means including an AC signal generator coupled to one of said first and second windings for supplying an AC signal thereof, the other of said first and second windings being responsive to said AC signal and said second magnetic field to develop an output signal, and first metering means coupled to said other of said first and second windings for measuring the magnitude of said output signal.

4. The flowmeter of claim 3 further including, a first DC supply coupled to said first winding for providing a bucking current therethrough having a direction of flow and magnitude to substantially cancel said first magnetic field through said first and second cores.

5. The flowmeter of claim 4 further including, a second DC supply coupled to said second winding for providing a balance current therethrough having a direction and magnitude to reduce said output signal substantially to zero and second metering means for measuring the amplitude of said balance current.

6. The flowmeter of claim 3 further including, second and third permanent magnets each having a longitudinal axis with the poles thereof positioned at opposite ends of said longitudinal axes, said second permanent magnet being positioned adjacent said first core at the end thereof opposite to said first permanent magnet with the axes of said first and second permanent magnets and said first core being substantially parallel and in line, said first and second permanent magnets having like poles adjacent said first core whereby said first magnetic field therein is substantially zero, said third permanent magnet being positioned adjacent said second core at the end thereof opposite to said first permanent magnet with the axes of said first and third permanent magnets and said second core being substantially parallel and in line, said first and third permanent magnets having like poles adjacent said second core whereby said first magnetic field therein is substantially zero.

* * * * *